UNITED STATES PATENT OFFICE.

SAMUEL RICHARDSON THOMPSON, OF LIVERPOOL, ENGLAND.

COMPOSITION FOR PIPE-JOINTS OR THE LIKE.

SPECIFICATION forming part of Letters Patent No. 615,000, dated November 29, 1898.

Application filed December 29, 1897. Serial No. 664,490. (No specimens.)

*To all whom it may concern:*

Be it known that I, SAMUEL RICHARDSON THOMPSON, a subject of the Queen of Great Britain and Ireland, and a resident of Ash Grove, Wavertree, Liverpool, England, have invented a certain new or Improved Composition for Pipe-Joints and the Like, of which the following is a specification.

My invention has for its object to produce a composition or cement, chiefly for making joints, of a nature which allows it to expand or contract with the expansion or contraction of the parts joined together and possessing the advantage of being readily removed in case the joints require to be broken for repair or renewal of the parts.

In accordance with my invention and in the proportion for making, say, one ton of composition (which is more or less the same for smaller or larger quantities) I take twelve hundredweight of paris-white, (carbonate of calcium,) five hundredweight of oxid of iron, (red ocher,) two and one-half hundredweight of brick-dust, (Venetian red,) and one-half hundredweight of plumbago or graphite. I then triturate or reduce each of such ingredients to a powder, and in such state I then mix or blend them and subject them to a fine sieving operation in suitable apparatus. When properly sieved and mixed and when required for making a joint, I work the mixture up with boiled linseed-oil to the consistency of a stiff putty, and in such condition the preparation is ready for use.

The peculiar properties of the cement are, first, the paris-white (for which chalk or whiting may be substituted) furnishes the required tenacity; the iron ore when intimately mixed gives the contracting and expanding property when exposed to changes from heat to cold, or vice versa, (which is very necessary to prevent the joint cracking;) the powdered brick-dust binds all the ingredients together, and the plumbago allows the cement to be readily removed from the surfaces of the metals when it is desired to break the joint. In this way the cement is extremely efficacious for joint-making, allows for expansion and contraction, and can be readily removed and renewed.

The proportions of the ingredients may be slightly varied, but those given above have been found to suit. A small quantity of any mineral color might be used for changing the hue as desired without materially affecting the efficiency of the cement, and which in this connection may be used as a paint.

A further improvement of the cement would be the addition of a little powdered asbestos or shredded hemp.

Having thus particularly described and ascertained the nature of my said invention and in what manner the same is to be performed, I declare that what I claim, and desire to secure by Letters Patent, is—

A composition composed of paris-white, oxid of iron, brick-dust, plumbago and linseed-oil in substantially the proportions specified, for the purposes set forth.

In testimony whereof I have hereunto set my hand in the presence of two witnesses.

SAMUEL RICHARDSON THOMPSON.

Witnesses:
WM. PIERCE,
S. MCCREADY.